No. 779,546. PATENTED JAN. 10, 1905.
W. S. JUDD.
SHOVEL.
APPLICATION FILED FEB. 13, 1903.
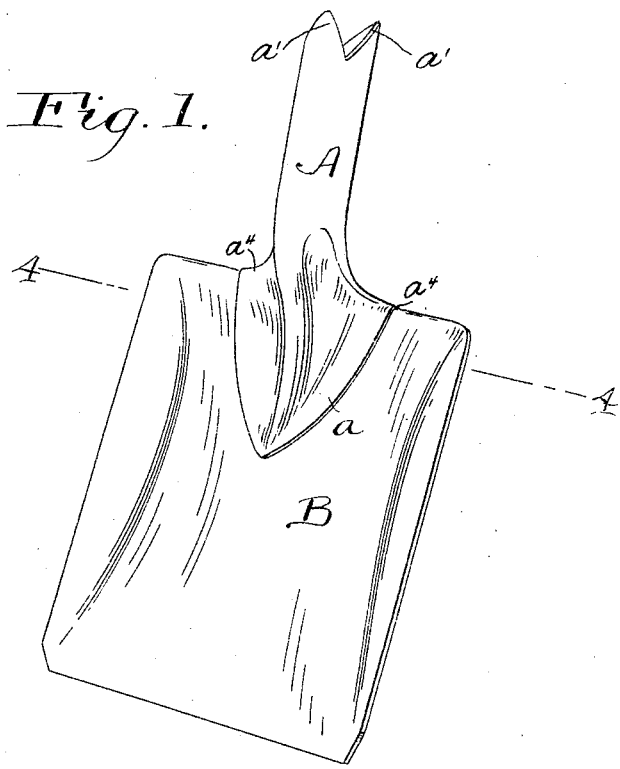
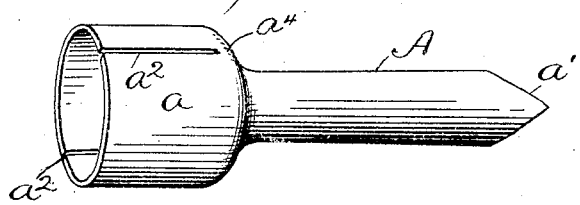
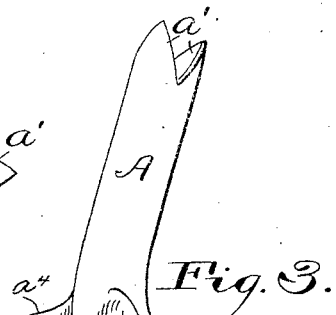
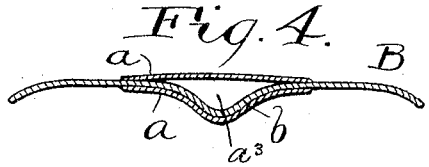
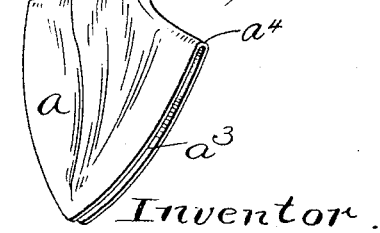
Witnesses.
E. B. Gilchrist
N. L. Bresnan
Inventor.
Wallace S. Judd,
By his Attorneys,
Thurston & Bates No. 779,546. Patented January 10, 1905.

UNITED STATES PATENT OFFICE.

WALLACE S. JUDD, OF CLEVELAND, OHIO, ASSIGNOR OF ONE-HALF TO THE AVERY STAMPING COMPANY, A CORPORATION OF OHIO.

SHOVEL.

SPECIFICATION forming part of Letters Patent No. 779,546, dated January 10, 1905.

Application filed February 13, 1903. Serial No. 143,171.

*To all whom it may concern:*

Be it known that I, WALLACE S. JUDD, a citizen of the United States, residing at Cleveland, in the county of Cuyahoga and State of Ohio, have invented certain new and useful Improvements in Shovels, of which the following is a full, clear, and exact description, reference being had to the accompanying drawings.

The object of this invention is to provide a shovel which shall combine the advantages of great strength, durability, convenience in use, and cheapness of construction. The characteristics of the shovel, by which these advantages are attained, are hereinafter more fully described, and set out in the claim.

The drawings clearly disclose the invention.

Figure 1 is a perspective view of the finished shovel ready for the insertion of any suitable handle. Fig. 2 is a perspective view of the bell-ended tube after it has been split. Fig. 3 is a perspective view of such tube after the bell end has been formed into shape. Fig. 4 is a cross-section of the shovel on the line 4 4 of Fig. 1.

The shovel comprises a blade B and a handle-shank A, which is made in the form of a tubular socket having at its lower end two integral shield-shaped wings $a$, which take onto the opposite sides of the blade and are there secured in suitable manner. At the sides of the tubular socket the wings $a$ are integrally connected over the upper edge of the blade by the shoulder portions $a^4$, which engage the upper edge of the blade. On its upper end the socket-piece A is notched so as to form V-shaped projections $a'$ to prevent there being any transverse line over which the handle might be strained or broken.

The shovel may be conveniently produced by the process shown, described, and claimed in my divisional application, Serial No. 208,391, filed May 17, 1904. This process consists, briefly, in taking a seamless drawn tube and forming on one end thereof (as by spinning or by dies) an enlarged bell, which is united with the tube A by an inclined integral neck $a^4$, as shown in Fig. 2. The bell is then bifurcated by two kerfs $a^2$, which extend from its end inward to the neck $a^4$. The two halves of the bell are then flattened, and the two wings thus formed are trimmed and shaped to fit the contour of the shovel-blade B. It will be seen that these two wings when the device is formed are integrally joined together at their upper ends on opposite sides of the socket-piece by what was part of the neck $a^4$ before the wings were flattened into shape.

The blade B may be formed up with a stiffening-ridge $b$ near its upper end. It is then inserted into the opening $a^3$ between the two wings, with its upper edge in contact with the part $a^4$, which connects these wings. The wings are then rigidly secured to the blade, as by welding or riveting.

The shovel produced is extremely strong. The small part of the tube forms a socket for a wooden handle, by which the handle is fully protected from moisture or dirt, and the socket presents a smooth surface for the user's hand. The engagement of the connecting part $a^4$ with the top edge of the shovel, as shown, relieves the connection between the wings and the shovel-blade from considerable lateral strain attendant upon use, while both wings reinforce the upper end of the blade and make the strongest possible connection between it and the socket-piece.

Having described my invention, I claim—

In a shovel, in combination, a blade, and a tubular socket having on its lower end two integral wings whose upper ends extend laterally on opposite sides of said socket-piece and are integrally connected together at the sides of the socket, said blade being inserted between said wings with its upper edge in contact with the part which unites them, and being secured to said wings.

In testimony whereof I hereunto affix my signature in the presence of two witnesses.

WALLACE S. JUDD.

Witnesses:
ALBERT H. BATES,
N. L. BRESNAN.